Dec. 13, 1938. J. H. LONSKEY 2,140,322
WOODWORKING MACHINE
Filed Feb. 10, 1936 3 Sheets-Sheet 1
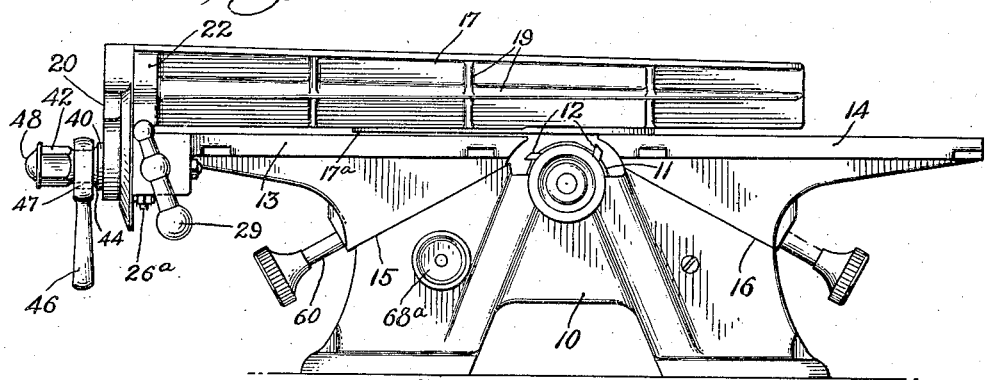
Inventor
John H. Lonskey
BY
Parker, Carlson, Pitzner & Hubbard
Attorneys.

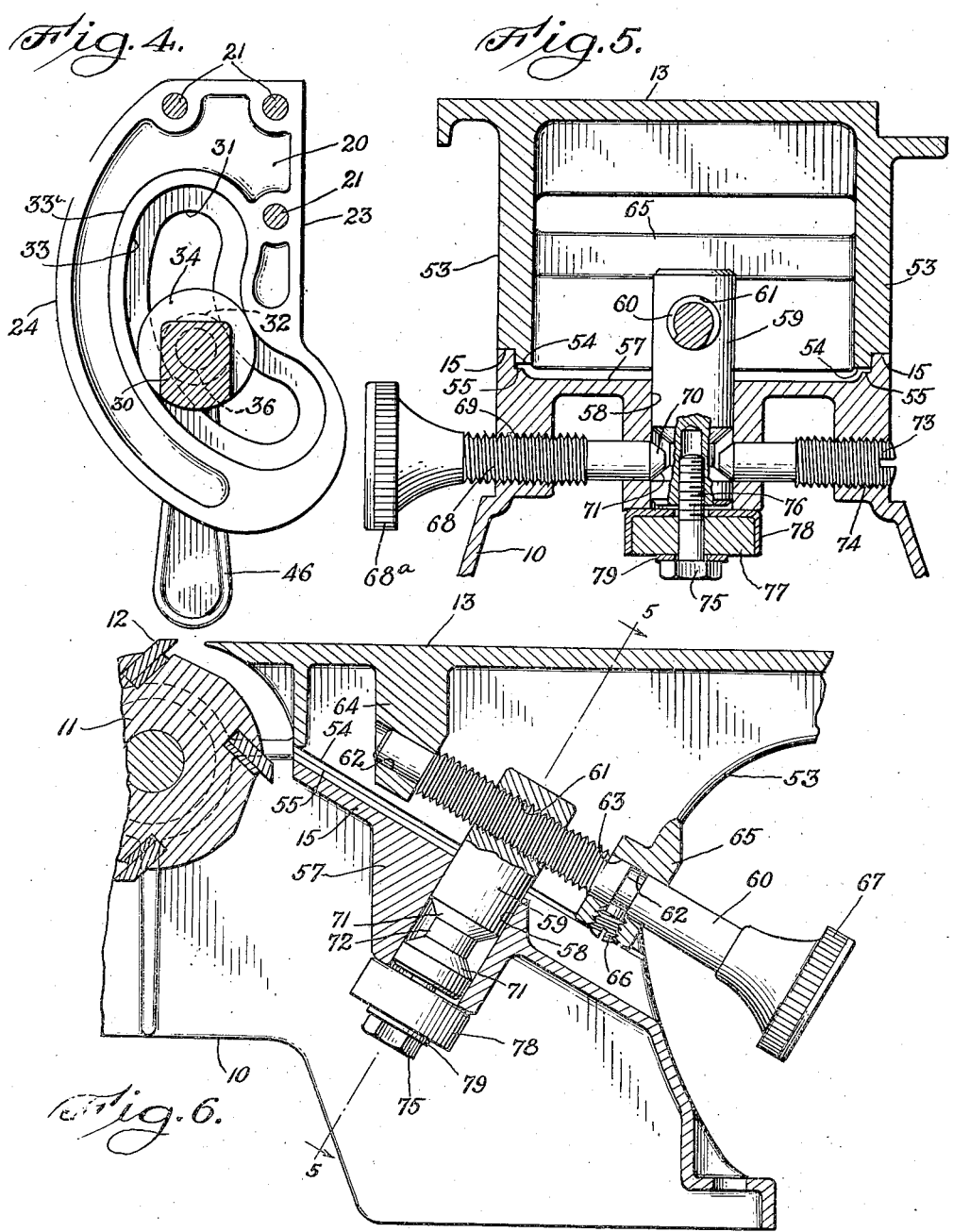

Dec. 13, 1938.    J. H. LONSKEY    2,140,322
WOODWORKING MACHINE
Filed Feb. 10, 1936    3 Sheets-Sheet 3

Inventor
John H. Lonskey
BY
Parker, Carlson, Pitzner & Hubbard
Attorneys.

Patented Dec. 13, 1938

2,140,322

UNITED STATES PATENT OFFICE 2,140,322

WOODWORKING MACHINE

John H. Lonskey, Ypsilanti, Mich., assignor to Central Specialty Co., Ypsilanti, Mich., a corporation of Michigan Application February 10, 1936, Serial No. 63,060

4 Claims. (Cl. 144—253)

My invention relates to wood working machines and more particularly to various improved arrangements for readily and accurately positioning the wood, or other material to be worked upon, with respect to the cutting tool of the machine.

Such wood working machines as jointers or planers, as well as bench saws, are ordinarily provided with a work-receiving table, and the cutting tool, such as the rotary cutter of a jointer or planer or a circular saw, extends above an edge of the table or through a suitable aperture therein. Since the cutting tool is driven at relatively high speed by an electric driving motor or the like, it is desirable that its position should remain fixed in order to simplify the driving arrangement, and the material to be worked upon must therefore be moved to the necessary position with respect to the cutting tool to effect the particular shaping thereof desired. It has heretofore been the common practice to provide some arrangement for adjusting the position of the table with respect to the cutting tool and also to provide a work-guiding fence extending horizontally along the table, which forms a lateral supporting surface for the material worked upon. The fence is ordinarily movable transversely of the table and its angular position with respect to the table is also preferably adjustable. That is, an arrangement may be provided to adjustably tilt the fence about either a vertical or horizontal axis or both, the fence being clamped in its adjusted position. It will be seen that by such a dual adjustment of the table and fence, a rigid support is provided against which a board or the like may be firmly pressed while moving the same into contact with the cutting tool at any selected angle of incidence.

It is an object of my invention to provide a wood working machine having an improved arrangement for moving an angularly adjustable fence transversely of the table without disturbing the angular adjustment thereof and for holding the fence in its adjusted transverse position without the necessity of actuating a separate clamping lever or the like.

Another object of my invention is to provide a wood working machine having an improved mechanism for effecting the angular adjustment of the fence, and for moving the same transversely of the table without disturbing the angular adjustment, the mechanism being capable of such adjustment of the fence with great accuracy and yet requiring a minimum amount of expensive precision machining and adjustment during the manufacture and assembly.

Another object of my invention is to provide a wood working machine having an improved mechanism for effecting the accurate angular and transverse adjustment of a fence therefor with respect to the table of the machine, the mechanism including a transverse shaft and a sleeve axially movable along the same upon rotation of the shaft, a plate rigidly secured to the fence substantially at right angles thereto, clamping means for selectively holding said plate in adjusted angular position with respect to the table, means operatively connecting the plate and sleeve for moving the plate transversely of the table.

Another object of my invention is to provide a wood working machine having an improved mechanism for effecting the accurate angular and transverse adjustment of a fence therefor with respect to the table of the machine, the mechanism including a transverse shaft arranged at one end of the table and having a sleeve axially movable along the same upon rotation of the shaft, a vertical plate secured to one end of the fence, means for clamping the plate in various angular positions on the sleeve, the mechanism having an extended portion bearing against a guide arranged substantially parallel to the axis of the cutting tool of the machine to prevent tilting of the plate and fence, and to hold the fence at right angles with respect to the cutting tool.

Further objects and advantages of my invention will become apparent as the following description proceeds and the features of novelty which characterize my invention are pointed out with particularity in the claims annexed to and forming a part of this specification.

For a better understanding of my invention, reference may be had to the accompanying drawings in which, Figure 1 is a side elevation of a jointer, embodying my invention.

Fig. 2 is an enlarged front end elevation partly in section of the fence adjusting mechanism for the jointer shown in Fig. 1.

Fig. 3 is an enlarged sectional view along the line 3—3 in Fig. 2 of the fence adjusting mechanism shown in Fig. 2.

Fig. 4 is a rear view of the protractor plate and locking mechanism therefor in section along the line 4—4 in Fig. 3.

Fig. 5 is an enlarged sectional view along the line 5—5 in Fig. 6 of the work-receiving table and of the supporting and adjusting mechanism therefor, of the jointer shown in Fig. 1.

Fig. 6 is an enlarged sectional side elevation of the front portion of the jointer shown in Fig. 1, showing particularly the front table supporting and adjusting mechanism.

Figure 7:
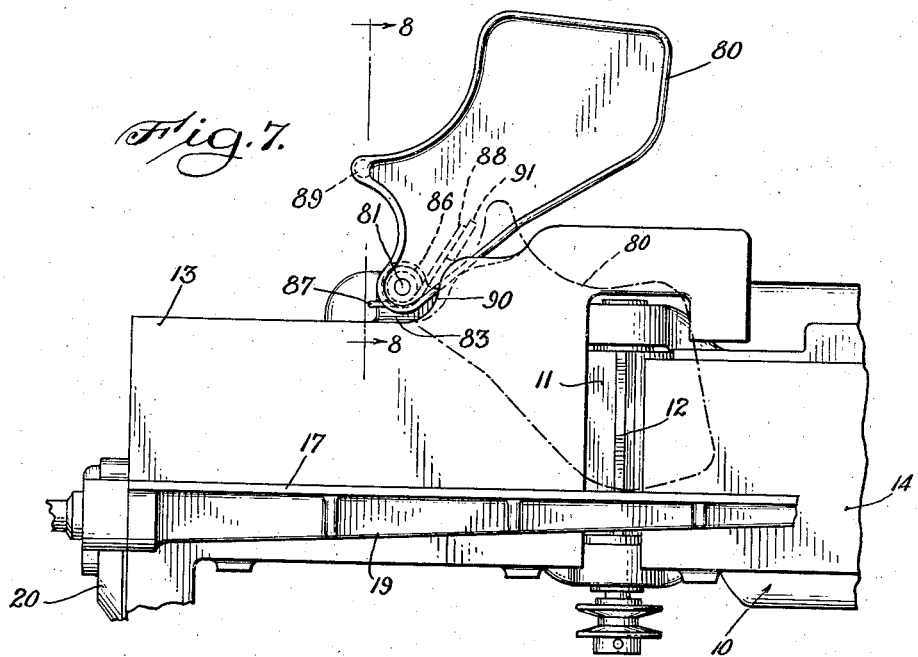
Fig. 7 is a plan view of a portion of the jointer shown in Figs. 1 and 2 illustrating particularly the guard plate arrangement for the cutting tool of the jointer.

Referring to the drawings, I have shown in Fig. 1 a jointer, which embodies my invention, and which is described in detail below, although it will be understood that various aspects of my invention are susceptible of application to numerous other forms and types of wood working machines. The jointer shown in Fig. 1 includes a base frame 10 having a rotary drum shaped cutting tool 11 journaled in suitable ball-bearings mounted on the upper portion thereof. The cutting tool 11 is rotatable about a horizontal axis and is preferably driven by an electric motor, which may be connected thereto by a suitable driving arrangement such as a belt. The cutting tool 11 is provided with one or more longitudinally extending cutting blades 12. A front table 13 and a rear table 14 are slidably mounted on inclined ways 15 and 16, respectively, formed on the base frame. The work-receiving tables 13 and 14 may be independently slid up or down along the inclined ways 15 and 16 respectively, by means of my improved adjusting mechanism, which is hereinafter described in greater detail. The flat upper surfaces of the tables 13 and 14 are thus moved vertically with respect to the cutting tool 11. This vertical adjustment of the tables 13 and 14 makes it possible to adjust the depth of cut made in the bottom of a board or the like which is moved along the work-receiving tables and into contact with the cutting tool 11.

A work-guiding fence 17 extends horizontally over the tables 13 and 14 and forms a lateral support for boards or the like which are moved across the tables into contact with the cutting tool 11. It will be noted that the fence 17 is provided with a smooth flat bearing surface 18 against which the wood may be pressed. A reenforcing web 19 is formed on the rear of the fence 17. Depending lugs 17ª are formed on the lower edge of the fence 17 and form a pivotal support for the fence.

I have provided an improved arrangement for moving the fence 17 transversely with respect to the tables 13 and 14, as well as for adjusting the angular position of the fence 17 with respect to the tables. It is possible, with my improved arrangement, to adjust the angular position of the fence 17 and then move the same transversely with respect to the tables without affecting or changing the angular adjustment. As a consequence, it is possible to secure a very accurate adjustment of the fence and when this adjustment has once been obtained it is unnecessary for the operator to waste time in again obtaining the desired angular adjustment even though the fence is moved transversely with respect to the table in order to bring the wood into contact with other and sharper parts of the cutting tool after a portion thereof has become dulled. In general, my improved supporting and adjusting arrangement for the fence includes a screw shaft or similar member extending transversely of the table and a traveling nut or the like mounted thereon to which the fence is connected. The friction between the screw shaft and nut serves to hold the fence in its adjusted transverse position so that no separate clamp need be provided for that purpose.

In the particular form of my invention illustrated, a protractor plate 20 is rigidly secured to the front end of the fence 17 by a series of screws 21, the inner ends of which are threaded in tapped holes formed in an integral triangular lug 22, which extends from the rear surface of the fence 17. The protractor plate 20 is formed with a straight edge 23 arranged substantially in alignment with the flat bearing surface 18 of the fence 17 and an arcuate oppositely positioned edge 24. An index scale 25 is formed on the arcuate edge 24 of the protractor plate 20 and indicates the angular relation of the flat bearing surface 18 of the fence 17 with respect to the flat upper surfaces of the tables 13 and 14.

The mechanism for moving the protractor plate 20 and fence 17 transversely with respect to the tables 13 and 14 includes an elongated shaft or screw 26 which extends transversely of the table 13 adjacent the front end thereof and is mounted in an elongated recess 27 formed in the front edge of the table 13. The opposite ends of the screw 26 are loosely journaled in suitable holes formed in the end walls of the recess 27 and axial movement of the screw 26 is prevented by a spline screw 26ª engaging a groove 26ᵇ in the shaft 26. One end 28 of the screw 26 extends entirely through the adjacent end wall of the recess 27 and a suitable crank type manual operating handle 29 is rigidly secured thereto. A sleeve or traveling nut 30 is threaded on the screw 26 and is thus moved axially along the same upon rotation of the screw by the operating handle 29.

An arrangement is provided for loosely mounting the protractor plate 20 on the traveling nut 30, as well as for clamping the plate 20 in various adjusted positions thereon. This arrangement includes arcuate slot 31 formed in the protractor plate 20 and a lateral cylindrical stud or projection 32 formed on the traveling nut 30 and extending through this arcuate slot. The center line of the arcuate slot 31 lies on a circle having its center at the intersection of the front face 18 of the fence 17 and the upper surface of the front table 13. An arcuate recess 33 is formed in the rear surface of the protractor plate 20 by a flange 33ª and extends entirely about the edges of the arcuate slot 31 therein and a disc shaped guide seat 34 formed on the projection 32 is slidably disposed in the arcuate recess 33. An arcuate flange 35 is formed on the front face of the protractor plate 20 and extends entirely about the edges of the arcuate slot 31. A suitable clamping arrangement is provided for clamping the protractor plate 20 between a member bearing against the front edge of the flange 35 and the guide seat member 34, which bears against the rear surface of the protractor plate 20. The protractor plate may thus be swung about an axis substantially coincident with the top of the table 13 by moving the projection 32 along the arcuate slot 31, and the protractor plate and its attached fence may then be clamped in any desired position.

As best shown in Fig. 3, the clamping arrangement includes a stud 36 having a threaded outer end 37 and a knurled inner end 38. The knurled inner end of the stud 36 has a force fit in an axial hole 39 formed in the projection 32. A pressure washer 40 having a convex spherical seat on the outer surface thereof is loosely mounted on the stud 36. The pressure washer 40 may be pressed tightly into engagement with the adjacent portion of the flange 35 formed on the protractor plate 20 by movement of a nut 42 along the stud 36, the nut 42 being threaded on the outer end portion 37 of the stud. The nut 42 includes a hexagonal head portion 43 and a tubular body portion 44 of somewhat smaller diameter than the hexagonal head. The inner end of the body portion 44 of the nut 42 is provided with a concave spherical bearing surface or seat 45, which may be pressed against the complementary spherical seat formed on the pressure washer 40. A disc shaped retainer 36ª is welded or otherwise rigidly secured to the outer end of the stud 36 and prevents the removal of the nut 42 therefrom.

A manual locking lever or wrench 46 is provided for moving the nut 42 along the stud 36 and thus clamping the protractor plate 20 between the pressure washer 40 and the guide seat 34. This locking lever 46 is provided with a socket head 47 adapted to fit the hexagonal head 43 of the nut 42. It will thus be seen that the socket head 47 of the operating handle 46 may be moved axially into operative engagement with the hexagonal head 43 of the nut or out of operative engagement with the same into a position where it surrounds the tubular portion 44 of the nut 42, which is of reduced outer diameter. A disc shaped locking lever retainer 48 is welded or otherwise rigidly secured to the outer end of the nut 42, the diameter of the retainer being somewhat greater than that of the recess formed in the socket portion 47 of the locking lever 46.

A guide is provided for preventing tilting of the protractor plate 20 and fence 17 about the axis of the screw 26 and for maintaining the fence substantially at right angles with respect to the cutter 11. As best shown in Fig. 3 this guide is preferably in the form of a rectangular strip of hardened steel 49 which is detachably secured to the lower side of the table 13 adjacent the front end thereof by screws 50. The screws 50 pass through laterally extending slots 51 formed in the strip 49 so that the strip may be adjusted laterally in such manner that its lateral edge 52, which extends laterally beyond the edge of the table 13, is arranged substantially parallel with the axis of the cutter 11 so that the fence 17 will be held at right angles to the cutter. This lateral edge 52 of the strip 49 is carefully machined in order that it will form a straight flat bearing surface for a downwardly projecting lower end portion of the protractor plate 20 which frictionally engages the same. This guide arrangement including the detachable strip secured to the table 13, is particularly advantageous in minimizing the amount of precision machining required in manufacturing the adjusting and clamping mechanism described above. That is, the upper surface of the table 13 is ground or otherwise machined flat as is the edge 52 of the strip 49. Then, when the strip 49 is secured to the table 13 by the screws 50, it may be readily and accurately positioned in alignment with the cutter 12 so that the fence 17 extends at right angles to the cutter. As a result, no guides or the like need be machined on the table 13 itself.

The only finishing on the end of the table and in the recess 27 that is required is the usual rough finishing given to the apparatus in order to improve its appearance. In particular, it is unnecessary to accurately machine the end of the table in alignment with the screw 26, and the screw 26 itself may be loosely mounted.

In the operation of the adjusting mechanism for the fence 17 described above the locking lever 46 is first moved into engagement with the nut 42 and the latter is unscrewed along the stud 36 so as to loosen the pressure washer 40. The protractor plate 20 is then moved with respect to the table 13 until the desired angular relation of the protractor plate and fence with respect to the top of the table is obtained. This angular position is accurately indicated by the index scale 25 on the protractor plate 20 at the front edge of the front table 13. The nut 42 is then moved along the stud 36 by the locking lever 46 until the pressure washer 40 is pressed tightly against the flange 35 on the protractor plate 20, thus firmly clamping the protractor plate and attached fence 17 in position. Since the pressure washer 40 and nut 42 are provided with spherical bearing surfaces 41 and 45 the stud 36 need not be arranged exactly at right angles with respect to the plate 20 as the clamping pressure on the spherical bearing surfaces will not cause any tilting of the plate 20 and attached fence 17 even if the stud 36 is somewhat out of alignment. When the protractor plate 20 is clamped in position in the manner described it will thus be seen that it has what amounts to a three-point support. In particular it contacts the guide strip 49 in at least two points spaced longitudinally on the strip and the third point of support is on the travelling nut 30. The locking lever 46 is then preferably slid along the nut 42 out of engagement with the hexagonal head 43 thereof, so that any subsequent accidental contact with the operating lever will not loosen the pressure washer 40 and thus change the angular adjustment of the protractor plate. After having secured the proper angular adjustment of the fence 17 in this manner, it may then be moved transversely with respect to the table 13 upon rotation of the shaft or screw 26 by rotation of the manual operating handle 29. As the operating handle 29 is turned, the rotation of the screw 26 causes the traveling nut 30 to move axially along the same and since the protractor plate 20 and the fence 17 are clamped to the traveling nut, they are also moved transversely with respect to the table 13. The friction between the screw shaft 26 and traveling nut 30 as well as the friction between the plate 20 and strip 49 holds the fence 17 in its adjusted transverse position without the use of any other clamping means. It should also be noted that all of the parts of the adjusting mechanism are readily accessible from the front of the table.

The jointer illustrated in the accompanying drawings also includes an arrangement for adjusting the position of the work-receiving tables with respect to the cutting tool of the machine. In general, I have provided an arrangement for selectively adjusting the relative vertical position of the tables with respect to the cutting tool and also an arrangement for rigidly clamping the tables in their adjusted position, thereby preventing actuation of the adjusting means. In the particular form of my invention illustrated and as best shown in Fig. 6, the front table 13 is provided with downwardly extending triangular shaped ribs or supporting members 53 which are slidably mounted on inclined rectangular ways 15. Downwardly extending inner flanges 54 are formed on the ribs 53 and rest in complementary notches 55 formed in the walls of the base 10 adjacent the ways 15, to prevent lateral displacement of the table 13 with respect to the inclined ways 15. A transverse web 57 is formed in the base 10 and is provided with a bore or recess 58 therein which is arranged substantially at right angles with respect to the ways 15. A table adjusting nut or plug 59 is loosely mounted in the bore 58 and an adjusting screw 60 is threaded in a tapped hole 61 extending transversely through the plug 59. The adjusting screw 60 is loosely journaled in holes 62 and 63 formed in depending lugs 64 and 65 extending from the lower side of the table 13. Axial movement of the adjusting screw 60 with respect to the table is prevented by spline screw 66 which engages a groove 67 in the adjusting screw 60. Consequently, rotation of the adjusting screw 60 by a suitable knurled head 67 causes the adjusting screw 60 to be screwed through the plug 59 and the table 13 is consequently moved along the inclined ways 15. It will thus be seen that the vertical position of the table 13 with respect to the cutting tool 11 may be adjusted with precision by the adjusting screw 60.

I have also provided an arrangement for locking the table in its adjusted position so as to prevent movement thereof by the adjusting screw 60. As best shown in Fig. 5, this arrangement includes a clamping screw 68 which is threaded in a tapped hole 69 formed in the base frame 10 and extending transversely thereof. The inner end 70 of the clamping screw 68 is beveled at substantially the same angle as the inclined walls 71 of an annular groove 72 formed in the lower portion of the plug 59. An oppositely positioned headless screw 73 is threaded in a tapped hole 74 formed on the opposite side of the base frame 10 substantially in axial alignment with the hole 69, and the tapered inner end of the screw 73 also engages the inclined wall of the groove 72. The headless screw 73 is screwed into the hole 74 a sufficient distance that its inner end frictionally engages the wall of the groove 72 formed in the plug 59 without, however, exerting sufficient pressure to prevent relative rotation between the adjusting screw 60 and the plug 59. Then when the clamping screw 68 is screwed into the tapped hole 69, its inner end wedges against the adjacent wall of the groove 72 and this wedging action causes the plug 59 to move downwardly. As a consequence, a very heavy frictional load is imposed on the contacting threads of the adjusting screw 60 and plug 59 so that relative movement therebetween is prevented. It will thus be seen that actuation of the adjusting screw 60 may be selectively prevented or permitted by tightening or loosening, respectively, of the clamping screw 68. The knurled head 68a of the clamping screw 68 is preferably positioned on the side of the base frame 10 in order that it will be readily accessible.

I have also provided an arrangement for maintaining a predetermined amount of tension on the table 13 so that some force is applied thereto to keep the bearing ways 15 in close contact even when the position of the table is being changed by the adjusting screw 60. As is best shown in Fig. 5, a cap screw 75 is threaded in a tapped hole 76 formed in the lower end of the plug 59. The cap screw 75 serves to clamp a disc shaped retaining member 77 firmly against the lower portion of the web 57. The retaining member 77 is resilient and is preferably made of soft rubber. A metal cup 78 is fitted over the upper end and sides of the retaining member 77 and a washer 79 is interposed between the adjacent surfaces of the head of the cap screw 75 and the retaining member 77. It will thus be seen that when the cap screw 75 is screwed into the hole 76, the retaining member 77 is compressed between the head of the cap screw 75 and the bottom of the downwardly extending portion of the web 57 in which the bore 58 is formed. As a consequence, a downward pull on the plug 59 is exerted and the bearing surfaces of the ways 15 are held in close contact. This pressure, however, is sufficiently small that the position of the table 13 may be readily changed by means of the adjusting screw 60 but the pressure tending to hold the bearing surfaces of the ways 15 together prevents sawdust, dirt, or other foreign matter from entering between the bearing surfaces and thus changing the adjustment of the table 13.

The improved mounting and adjusting arrangement for the work-receiving table which I have described above is particularly advantageous in another respect in that the table may be removed from the inclined way on which it is mounted and then replaced without altering the positional adjustment of the table. Thus, if it is desired to remove the table 13 from the base 10 the headless screw 73, as well as the clamping screw 68 are retracted until their inner ends are out of engagement with the groove 72 formed in the plug 59. The cap screw 75, retaining member 77, cup 78, and washer 79 are also removed. The table 13 may then be readily lifted from the base 10, the plug 59 being moved upwardly out of the bore 58 until it is free of the same. When the table is again reassembled on the base the plug 59 is inserted into the bore 58 and the screws 68 and 73, as well as the cap screw 75 and the retaining member parts are replaced. It will thus be seen that it is possible to remove the table 13 from the way 15 without changing the position or adjustment of the adjusting screw 60 so that when the table 13 is put back on the way 15, its previous adjustment with respect to the cutting tool 11 will be retained. Moreover, simple easily manufactured rectangular ways rather than dove-tail ways are used and it is unnecessary to provide gibs or the like to prevent separation of the bearing surfaces of the ways.

The rear work-receiving table 14 is provided with an adjusting and clamping arrangement for mounting it on the inclined ways 16 which is substantially identical with that described above for the front table 13.

Figure 8:
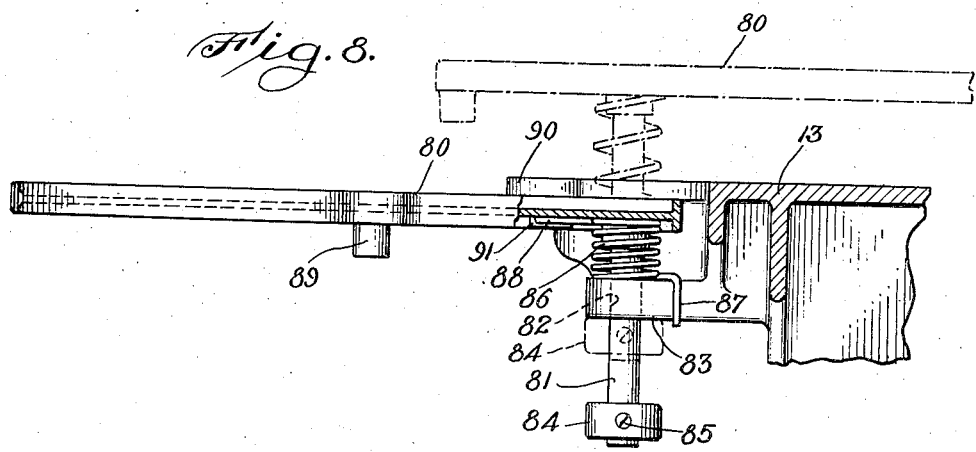
Fig. 8 is an enlarged fragmentary view of the supporting and biasing arrangement for the guard plate shown in Fig. 7, the guard plate being illustrated in its retracted position.

As best shown in Figs. 7 and 8, I have provided a guard plate arrangement in which a flat guard plate is normally positioned above the cutting tool in such manner that the guard plate covers the portion of the cutting tool which is not covered by the board or other piece of material being shaped. The mounting for the guard plate is also so arranged that the guard plate may be readily latched in a retracted position in order to facilitate inspection, assembly, disassembly or repair of the cutting tool. In the machine illustrated, a flat guard plate 80 is mounted on a downwardly extending pivot pin 81 in such manner that it may swing in a horizontal plane above the cutting tool 11. The guard plate 80 is shown in its retracted position in Figs. 7 and 8, its normal position above the cutting tool being indicated in dot-dash lines. The lower end of the pivot pin 81 is loosely journaled in a hole 82 formed in a lateral projection 83 extending from the side of the front work-receiving table 13. A collar 84 is detachably secured to the lower portion of the pivot pin 81 by a set screw 85 thus limiting upward axial movement of the pivot pin. A helical spring 86 surrounds the pivot pin 81, the lower end 87 of the spring 86 being hooked over the projection 83. The upper end 88 of the spring 86 bears against a downwardly extending lug 91 formed on the lower surface of the guard plate 80. It will thus be seen that spring 86 supports the guard plate 80 above the cutting tool 11 under axial compression while the torsional tension in the spring tends to swing the guard plate in a clockwise direction as viewed in Fig. 7, thus positioning the same over the cutting tool. A downwardly extending lug 89 formed on the outer edge of the guard plate 80 limits this clockwise movement of the guard plate. When it is desired to expose the cutting tool 11 in order to inspect the same or to remove it from the machine, repair it or the like, the guard plate may be swung in a counter-clockwise direction, as viewed in Fig. 7, and then depressed by the operator against the tension of the spring 86. When in this depressed position the forward edge of the guard plate may be latched under the flange or projection 90 formed on the adjacent edge of the table 13 in the position shown in full lines in Figs. 7 and 8 so that the guard plate is thus held in its retracted position.

Although I have shown a particular embodiment of my invention in connection with a jointer particularly designed for use in a small work shop, it will be understood that I do not desire to limit my invention to the particular construction shown and described and in the appended claims I intend to cover all modifications within the spirit and scope of my invention.

I claim as my invention:

1. In combination with a wood working machine provided with a work-receiving table and a cutting tool, a rotatable shaft mounted adjacent one end of the table and extending transversely thereof, a sleeve mounted on said shaft, means including cooperating parts on said shaft and sleeve for effective axial movement of said sleeve along said shaft upon rotation of said shaft, a manual operating handle for said shaft, a vertically positioned plate having an arcuate slot formed therein, a threaded stud projecting laterally from said sleeve and extending through said slot, means including a nut threaded on said stud for clamping said plate on said sleeve in various adjusted positions thereof, means including a manually operable locking lever for moving said nut, said locking lever being provided with a socket portion movable axially along said stud into and out of operative position with respect to said nut, and a fence rigidly secured to said plate and extending over the table.

2. In combination with a wood working machine provided with a work receiving table and a cutting tool, an elongated rotatable screw mounted adjacent one end of the table and extending transversely thereof, a traveling nut mounted on said screw, said traveling nut being movable axially along said screw upon rotation of said screw, a manual operating handle for rotating said screw, a vertically positioned plate having an arcuate slot formed therein, a threaded stud projecting laterally from said traveling nut and extending through said slot, means including a nut threaded on said stud and a clamping washer interposed between said nut and said plate for clamping said plate on said sleeve in various adjusted positions thereof, said nut and said clamping washer being provided with cooperating adjacent spherical bearing surfaces, and a fence rigidly secured to said plate and extending over the table.

3. The combination in a wood working machine having a work table and a transversely disposed rotatable cutting tool, of a work guiding fence extending over the table and a mechanism for traversing said fence axially of said tool and clamping the same accurately in position at right angles to the tool axis, said mechanism comprising a transversely extending lead screw disposed on said table at one end thereof, means for journaling said screw on said table for rotational movement while restraining the same against bodily axial movement, a traveling nut on said screw traversable along the same transversely of said table upon rotation of said screw, a guide member presenting a smooth machined lateral edge, means for adjustably securing said guide member to said end of said table with said edge paralleling said tool axis and projecting outwardly from the adjacent end portion of the table, a plate fast on the outer end of said fence and depending over the end of said table, said plate presenting a flat inner surface abutting said guide member edge, and means for releasably clamping said plate against said nut and in contact with a substantial length of said guide member edge to form in effect a rigid three-point support for said fence lying in a plane determined by the position of the edge of said adjustable guide member and paralleling said tool axis.

4. The combination in a wood working machine having a work table and a transversely disposed rotatable cutting tool, of a work guiding fence extending over the table and a mechanism for traversing said fence axially of said tool and clamping the same accurately in position at right angles to the tool axis, said mechanism comprising a transversely extending elongated rotatable shaft disposed on said table at one end thereof, means for journaling said shaft on said table for rotational movement while restraining the same against bodily axial movement, a sleeve on said shaft traversable along the same transversely of said table upon rotation of said shaft, a guide member presenting a smooth machined lateral edge, means for adjustably securing said guide member to said end of said table with said edge paralleling said tool axis and projecting outwardly from the adjacent end portion of the table, a plate fast on the outer end of said fence and depending over the end of said table, said plate presenting a flat inner surface abutting said guide member edge, and means for releasably clamping said plate against said sleeve in selected angular positions about a horizontal axis longitudinal of the table and with said inner plate surface in contact with a substantial length of said guide member edge to form in effect a rigid three-point support for said fence lying in a plane determined by the position of the edge of said adjustable guide member and paralleling said tool axis.

JOHN H. LONSKEY.